United States Patent
Tagawa

(10) Patent No.: US 11,999,384 B2
(45) Date of Patent: Jun. 4, 2024

(54) TRAVEL ROUTE GENERATION DEVICE AND CONTROL DEVICE

(71) Applicant: IHI CORPORATION, Tokyo (JP)

(72) Inventor: Satoru Tagawa, Tokyo (JP)

(73) Assignee: IHI CORPORATION, Tokyo (JP)

( * ) Notice: Subject to any disclaimer, the term of this patent is extended or adjusted under 35 U.S.C. 154(b) by 142 days.

(21) Appl. No.: 17/619,726

(22) PCT Filed: Jun. 17, 2020

(86) PCT No.: PCT/JP2020/023759
§ 371 (c)(1),
(2) Date: Dec. 16, 2021

(87) PCT Pub. No.: WO2020/256015
PCT Pub. Date: Dec. 24, 2020

(65) Prior Publication Data
US 2022/0355823 A1    Nov. 10, 2022

(30) Foreign Application Priority Data

Jun. 18, 2019    (JP) .................................. 2019-112892

(51) Int. Cl.
*B60W 60/00* (2020.01)
(52) U.S. Cl.
CPC ..... *B60W 60/0016* (2020.02); *B60W 2552/53* (2020.02); *B60W 2720/106* (2013.01)
(58) Field of Classification Search
None
See application file for complete search history.

(56) References Cited

U.S. PATENT DOCUMENTS

| | | | |
|---|---|---|---|
| 11,046,310 B2* | 6/2021 | Yoo | G08G 1/167 |
| 2006/0287808 A1 | 12/2006 | Breitenberger et al. | |
| 2013/0158865 A1 | 6/2013 | Na et al. | |
| 2017/0060137 A1 | 3/2017 | Shitamoto | |
| 2017/0329331 A1* | 11/2017 | Gao | B60W 50/082 |
| 2018/0059672 A1* | 3/2018 | Li | B60W 30/00 |
| 2018/0196442 A1* | 7/2018 | Wang | G05D 1/0214 |
| 2018/0239359 A1 | 8/2018 | Jian | |

(Continued)

FOREIGN PATENT DOCUMENTS

| | | |
|---|---|---|
| CN | 107346611 A | 11/2017 |
| CN | 108944864 A | 12/2018 |

(Continued)

*Primary Examiner* — Peter D Nolan
*Assistant Examiner* — Jacob Kent Besteman-Street

(57) ABSTRACT

A travel route generation device (4) includes a travel route acquisition unit (4) configured to acquire position information (Pc) about a travel route (H) for a moving object (M) to perform autonomous travel or remotely controlled travel, a surrounding environment information acquisition unit (22) configured to acquire surrounding environment information, a dangerous location detection unit (23) configured to detect dangerous locations (Pd1 to Pd3) where there is a risk of an accident from the surrounding environment information, and an information processing unit (24) configured to add dangerous location information including first information indicating the dangerous locations (Pd1 to Pd3) to the position information (Pc) corresponding to the dangerous locations (Pd1 to Pd3).

3 Claims, 5 Drawing Sheets

(56) References Cited

U.S. PATENT DOCUMENTS

2019/0353497 A1* 11/2019 Murashita ................ G08G 1/14
2023/0055023 A1* 2/2023 Ando .................... G08G 1/0133

FOREIGN PATENT DOCUMENTS

| DE | 102011122297 A1 | 6/2013 |
| DE | 102013205392 A1 | 10/2014 |
| JP | 2662946 B2 | 10/1997 |
| JP | 2006-521603 A | 9/2006 |
| JP | 2009-301267 A | 12/2009 |
| JP | 2016-218505 A | 12/2016 |
| JP | 2018-139032 A | 9/2018 |
| JP | 2018-155577 A | 10/2018 |
| WO | WO-2017057055 A1 * | 4/2017 |

\* cited by examiner

| COURSE INFORMATION | DANGEROUS LOCATION |
|---|---|
| Pc1 | |
| Pc2 | |
| Pc3 | ◯ |
| Pc4 | ◯ |
| Pc5 | |
| Pc6 | |
| Pc7 | ◯ |
| Pc8 | ◯ |
| Pc9 | |
| Pc10 | ◯ |
| Pc11 | ◯ |

◯ : FIRST INFORMATION
(DANGEROUS LOCATION INFORMATION)

FIG. 6A

| COURSE INFORMATION | DANGEROUS LOCATION |
|---|---|
| Pc1 | |
| Pc2 | |
| Pc3 | PEDESTRIAN CROSSING |
| Pc4 | TEMPORARY STOP |
| Pc5 | |
| Pc6 | |
| Pc7 | UNEVENNESS OF ROAD SURFACE |
| Pc8 | UNEVENNESS OF ROAD SURFACE |
| Pc9 | |
| Pc10 | PROXIMITY |
| Pc11 | PROXIMITY |

FIG. 6B

| COURSE INFORMATION | DANGEROUS LOCATION | OPERATION OF VEHICLE |
|---|---|---|
| Pc1 | | |
| Pc2 | | |
| Pc3 | PEDESTRIAN CROSSING | TEMPORARY STOP |
| Pc4 | TEMPORARY STOP | TEMPORARY STOP |
| Pc5 | | |
| Pc6 | | |
| Pc7 | UNEVENNESS OF ROAD SURFACE | AVOIDANCE |
| Pc8 | UNEVENNESS OF ROAD SURFACE | AVOIDANCE |
| Pc9 | | |
| Pc10 | PROXIMITY | DECELERATION |
| Pc11 | PROXIMITY | DECELERATION |

TRAVEL ROUTE GENERATION DEVICE AND CONTROL DEVICE

TECHNICAL FIELD

The present disclosure relates to a travel route generation device and a control device.

Priority is claimed on Japanese Patent Application No. 2019-112892, filed Jun. 18, 2019, the content of which is incorporated herein by reference.

BACKGROUND ART

In the following Patent Document 1, a travel control method for use in a vehicle that travels automatically in an unmanned manner is disclosed. In this travel control method, a vehicle is allowed to travel along an actual travel route according to manned control and allowed to travel automatically on the basis of position information after acquiring the position information about the travel route.

CITATION LIST

Patent Document

[Patent Document 1]
Japanese Patent No. 2662946

SUMMARY OF INVENTION

Technical Problem

Incidentally, there may be a location where there is a risk of an accident (hereinafter referred to as a "dangerous location") on a travel route. However, in the above-described Patent Document 1, no consideration is given in relation to dangerous locations in performing automated travel and there is room for improvement in implementing the safe traveling of a transportation vehicle.

The present disclosure has been made in view of the above circumstances and an objective of the present disclosure is to provide a travel route generation device and a control device capable of allowing a vehicle to travel safely.

Solution to Problem

According to a first aspect of the present disclosure, there is provided a travel route generation device including: a travel route acquisition unit configured to acquire position information about a travel route for a moving object to perform autonomous travel or remotely controlled travel; a surrounding environment information acquisition unit configured to acquire surrounding environment information which is information about a surrounding environment of the moving object; a dangerous location detection unit configured to detect dangerous locations where there is a risk of an accident from the surrounding environment information when the moving object travels along the travel route; and an information processing unit configured to add dangerous location information including first information indicating the dangerous locations to the position information corresponding to the dangerous locations detected by the dangerous location detection unit.

According to a second aspect of the present disclosure, in the travel route generation device according to the above-described first aspect, the dangerous locations may include at least one of a first dangerous location having a road marking and a second dangerous location where the moving object and an obstacle are in proximity to each other.

According to a third aspect of the present disclosure, in the travel route generation device according to the above-described first or second aspect, the information processing unit may add the dangerous location information further including second information indicating an operation of the moving object for reducing a risk at the dangerous location to the position information corresponding to the dangerous location detected by the dangerous location detection unit.

According to a fourth aspect of the present disclosure, there is provided a control device including: the travel route generation device according to the above-described first or second aspect; and a travel control device configured to cause the moving object to perform the autonomous travel or the remotely controlled travel, wherein, when the moving object travels at a position of the position information to which the dangerous location information is added, the travel control device controls the travel of the moving object so that a travel speed of the moving object is decelerated to a prescribed speed or less.

According to a fifth aspect of the present disclosure, there is provided a control device including: the travel route generation device according to the above-described third aspect; and a travel control device configured to cause the moving object to perform the autonomous travel or the remotely controlled travel, wherein, when the moving object travels at a position of the position information to which the dangerous location information is added, the travel control device controls the travel of the moving object in accordance with the second information to which the position information is added.

Effects of Invention

As described above, according to the present disclosure, it is possible to allow a vehicle to travel safely.

BRIEF DESCRIPTION OF DRAWINGS

FIG. 6A is a diagram showing a modified example of dangerous location information according to the present embodiment.

FIG. 6B is a diagram showing a modified example of dangerous location information according to the present embodiment.

DESCRIPTION OF EMBODIMENTS

Hereinafter, a travel route generation device according to the present embodiment and a control device including the travel route generation device will be described with reference to the drawings.

Figure 1:
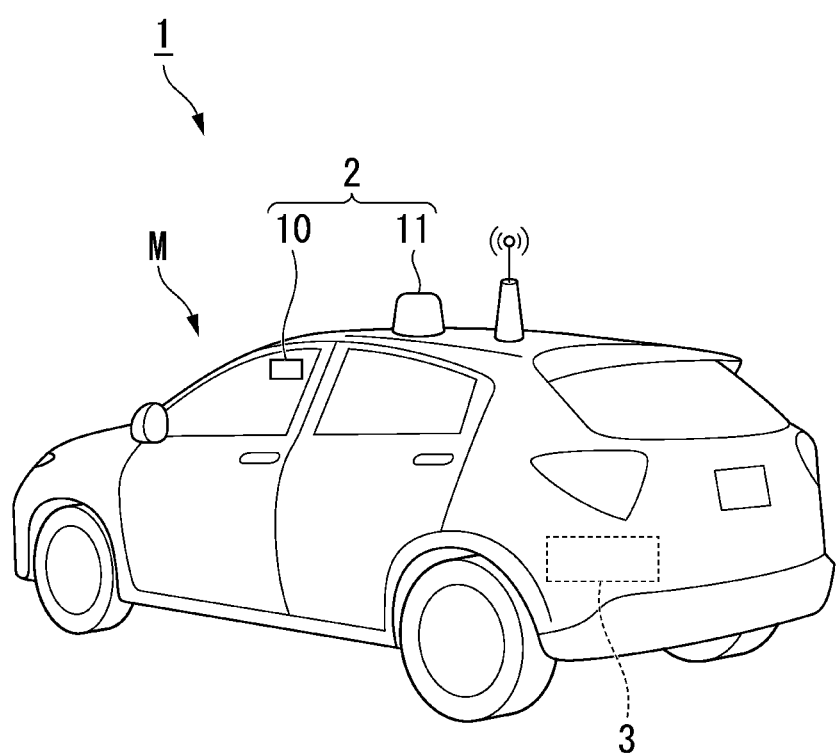
FIG. 1 is a diagram showing a schematic configuration of a travel control system according to the present embodiment.

FIG. 1 is a diagram showing a schematic configuration of a travel control system 1 according to the present embodiment.

The travel control system 1 according to the present embodiment performs automated driving for a moving object such as a vehicle or a robot by controlling the traveling of the moving object. In the present embodiment, the moving object is a vehicle M. The vehicle M may be manned or unmanned. The vehicle M may be a general vehicle, a transportation vehicle (a semi-trailer or a full trailer) that transports a container, or a construction machine such as an excavator car, a bulldozer, or a crane car for use in civil engineering work or construction work.

The travel control system 1 includes a surrounding environment measurement device 2 and a control device 3.

The surrounding environment measurement device 2 measures information about a surrounding environment of the vehicle M. In the present embodiment, the surrounding environment measurement device 2 includes a camera 10 and a distance sensor 11.

The camera 10 images surroundings of the vehicle M (the front, sides, rear, and the like thereof). The camera 10 transmits a captured image (image data) to the control device 3.

The distance sensor 11 measures a distance to a physical object near the vehicle M. For example, the distance sensor 11 is a two-dimensional or three-dimensional measurement device such as a laser range finder (LRF) or laser radar and measures a shape in the surroundings of the vehicle M. The shape in the surroundings is, for example, a three-dimensional shape of a structure existing on the ground or in the surroundings of a route of passage. That is, the shape in the surroundings of the vehicle M is a three-dimensional shape of a structure surrounding the vehicle M. More specifically, for example, the distance sensor 11 scans laser light in the horizontal direction or the vertical direction with respect to the measurement range and acquires three-dimensional coordinate values of a plurality of measurement points within the measurement range from reflected light of the laser light. Thereby, a surrounding environment of the vehicle M is three-dimensionally measured. The distance sensor 11 transmits measurement data to the control device 3.

The control device 3 includes a route acquisition mode in which position information about a travel route H is acquired when the vehicle M is traveling along the travel route H in manned control and an autonomous travel mode in which the vehicle M is allowed to travel automatically along the travel route H by controlling the traveling of the vehicle M on the basis of the position information acquired in the route acquisition mode.

A configuration of the control device 3 according to the present embodiment will be described below.

Figure 2:
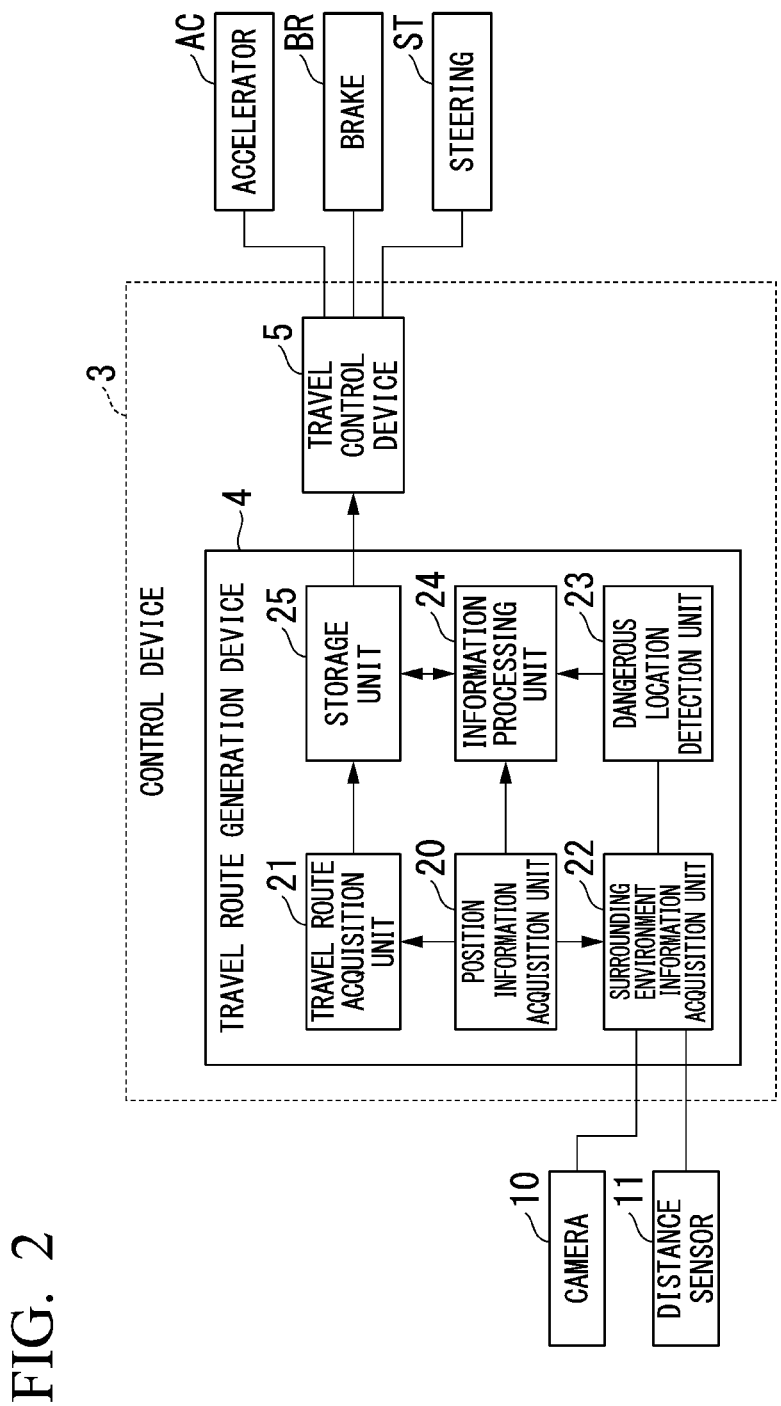
FIG. 2 is a diagram showing a schematic configuration of a control device according to the present embodiment.

FIG. 2 is a diagram showing a schematic configuration of the control device 3 according to the present embodiment.

The control device 3 includes a travel route generation device 4 and a travel control device 5. The travel route generation device 4 may include a microprocessor such as a central processing unit (CPU) or a microprocessor unit (MPU), a microcontroller such as a microcontroller unit (MCU), or the like.

The travel route generation device 4 includes a position information acquisition unit 20, a travel route acquisition unit 21, a surrounding environment information acquisition unit 22, a dangerous location detection unit 23, an information processing unit 24, and a storage unit 25. All or some of the position information acquisition unit 20, the travel route acquisition unit 21, the surrounding environment information acquisition unit 22, the dangerous location detection unit 23, the information processing unit 24, and the storage unit 25 are a type of computer including a CPU, a main storage device such as a random access memory (RAM) or a read only memory (ROM), and an auxiliary storage device such as a solid state drive (SSD) or a hard disc drive (HDD).

The position information acquisition unit 20 acquires information (hereinafter referred to as "position information") Pm about a current position of the vehicle M. For example, the position information acquisition unit 20 may acquire the position information Pm of the vehicle M in global coordinates using a Global Positioning System (GPS). However, the present disclosure is not limited to this. For example, the position information acquisition unit 20 may acquire the position information Pm of the vehicle M by performing scan matching to which an iterative closest point (ICP) algorithm is applied using the above-described measurement data (point group data). Also, the position information acquisition unit 20 may acquire its own position using radio-frequency identification (RFID), a magnetic sensor, or the like. That is, in the present disclosure, a method of acquiring the position information Pm in the position information acquisition unit 20 is not limited particularly. The position information acquisition unit 20 can acquire the position information Pm of the vehicle M using various known technologies.

In the route acquisition mode, the travel route acquisition unit 21 acquires position information (hereinafter referred to as "course information") Pc about the travel route H for the vehicle M to perform autonomous travel or remotely controlled travel. For example, in the route acquisition mode, when the vehicle M is traveling along the travel route H in a manned manner, the travel route acquisition unit 21 acquires the position information Pm from the position information acquisition unit 20 in time series to obtain the course information Pc. That is, the position information Pm obtained when the vehicle M travels along the travel route H in a manned manner becomes the course information Pc.

However, it is sufficient for the travel route acquisition unit 21 to acquire the course information Pc and the method of acquiring the course information Pc is not limited particularly. For example, the travel route acquisition unit 21 may acquire the course information Pc from an external device (outside the vehicle M).

The surrounding environment information acquisition unit 22 acquires the surrounding environment information which is information about a surrounding environment of the vehicle M. Specifically, in the route acquisition mode, the surrounding environment information acquisition unit 22 acquires a captured image from the camera 10 and measurement data from the distance sensor 11 as the surrounding environment information in accordance with the acquisition of the course information Pc. For example, the surrounding environment information acquisition unit 22 associates the course information Pc acquired at regular intervals with the surrounding environment information (the captured image and the measurement data) in the route acquisition mode.

In this way, the surrounding environment information acquisition unit 22 acquires the surrounding environment information, which is the information about the surrounding environment of the vehicle M, from the start point to the end point of the travel route H.

Figure 3:
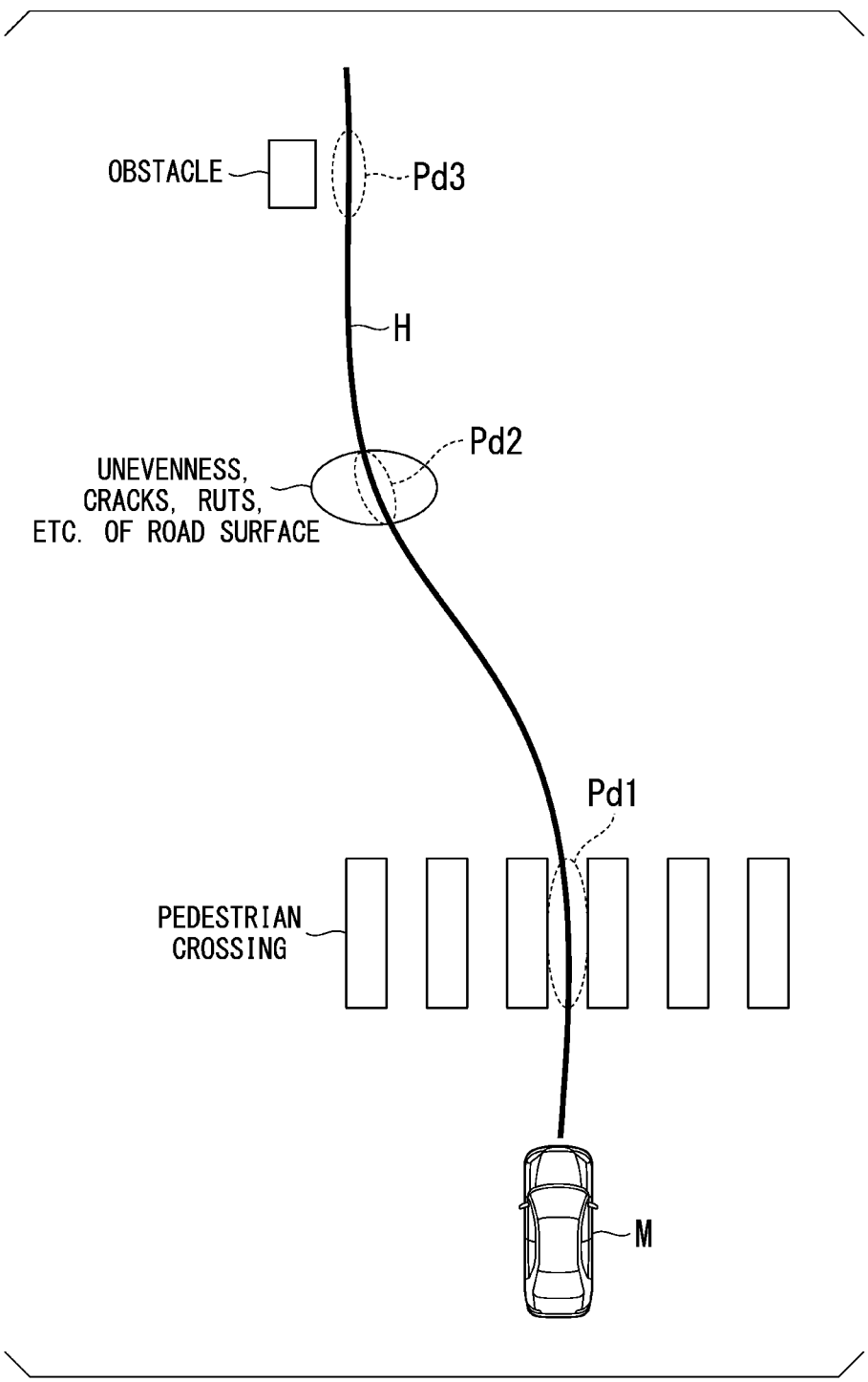
FIG. 3 is a diagram for describing a dangerous location according to the present embodiment.

As shown in FIG. 3, the dangerous location detection unit 23 detects dangerous locations Pd where there is a risk of an accident from the surrounding environment information when the vehicle M travels along the travel route H. These dangerous locations Pd include at least one of a dangerous location Pd1 and a dangerous location Pd3 to be described below. That is, the dangerous location Pd may be the dangerous location Pd1 or the dangerous location Pd3 or the dangerous locations Pd may include both the dangerous location Pd1 and the dangerous location Pd3. The dangerous locations Pd may further include a dangerous location Pd2 to be described below. Here, the dangerous location Pd1 is a location with a road marking such as a pedestrian crossing or a temporary stop. The dangerous location Pd2 is a location where any of unevenness, cracks, and ruts of a road surface occurs. The dangerous location Pd3 is a location where the vehicle M and an obstacle are in proximity to each other. For example, the dangerous location Pd3 is a location where the distance between the vehicle M and the obstacle is less than or equal to a threshold value.

Also, the dangerous location Pd1 is an example of a "first dangerous location" of the present disclosure. The dangerous location Pd3 is an example of a "second dangerous location" of the present disclosure.

For example, the dangerous location detection unit 23 detects road markings from surrounding environment information by applying known technology. For example, the dangerous location detection unit 23 can detect road markings from measurement data by applying a method described in "Transactions of the Society of Automotive Engineers of Japan, Inc., Vol. 45, No. 6, Pages 1165-1170, 2014."

The dangerous location detection unit 23 sets a position of a road marking detected from the surrounding environment information as the dangerous location Pd1 and detects the dangerous location Pd1 from the position information Pm or the like associated with the surrounding environment information. In other words, the dangerous location detection unit 23 sets the dangerous location Pd1 on the basis of specific surrounding environment information indicating a road marking in the surrounding environment information and detects a position of the dangerous location Pd1 on the travel route H on the basis of the specific position information Pm (or the specific course information Pc or the like) associated with the specific surrounding environment information in the position information Pin (or the course information Pc of the travel route H) of the vehicle M acquired in time series from the start point to the end point of the travel route H.

For example, the dangerous location detection unit 23 detects a state of the road surface (unevenness, cracks, ruts, or the like of the road surface) from the captured image and the measurement data by applying known technology. For example, the dangerous location detection unit 23 can detect the state of the road surface (unevenness, cracks, ruts, or the like of the road surface) from the captured image and the measurement data by applying methods described in "Journal of Japan Society of Civil Engineers, Vol. 70, No. 3, Pages I_9-I_16, 2015" and "Journal of Japan Society of Civil Engineers, Vol. 69, No. 3, Pages I_9-I_16, 2013".

The dangerous location detection unit 23 sets a position of any of unevenness, cracks, and ruts of the road surface detected from the surrounding environment information as the dangerous location Pd2 and detects the dangerous location Pd2 from the position information Pm or the like associated with the surrounding environment information. In other words, the dangerous location detection unit 23 sets the dangerous location Pd2 on the basis of specific surrounding environment information indicating unevenness, cracks, and ruts of the road surface in the surrounding environment information and detects a position of the dangerous location Pd2 on the travel route H on the basis of the specific position information Pm (or the specific course information Pc and the like) associated with the specific surrounding environment information in the position information Pm (or the course information Pc of the travel route H and the like) of the vehicle M acquired in time series from the start point to the end point of the travel route H.

For example, the dangerous location detection unit 23 may measure a distance between the vehicle M and the obstacle from the captured image or the measurement data by applying known technology. For example, when the distance between the vehicle M and the obstacle is less than or equal to the threshold value, the dangerous location detection unit 23 determines that the vehicle M is in proximity to the obstacle and detects the position information Pm of the vehicle M as a third dangerous location. In other words, the dangerous location detection unit 23 sets the dangerous location Pd3 on the basis of specific surrounding environment information indicating that the distance between the vehicle M and the obstacle is less than or equal to the threshold value in the surrounding environment information and detects a position of the dangerous location Pd3 on the travel route H on the basis of the specific position information Pm (or the specific course information Pc and the like) associated with the specific surrounding environment information in the position information Pm (or the course information Pc of the travel route H and the like) of the vehicle M acquired in time series from the start point to the end point of the travel route H.

The information processing unit 24 adds dangerous location information including the first information indicating the dangerous location Pd to the course information Pc corresponding to the dangerous location Pd detected by the dangerous location detection unit 23 and stores the course information Pc to which the dangerous location information is added in the storage unit 25. For example, the information processing unit 24 stores the course information Pc corresponding to the dangerous location Pd detected by the dangerous location detection unit 23 and the dangerous location information including the first information indicating the dangerous location Pd in association in the storage unit 25.

For example, when course information Pc3 and course information Pc4 in course information Pc1 to Pc11 are about positions corresponding to the dangerous location Pd1, the information processing unit 24 adds the dangerous location information to the course information Pc3 and the course information Pc4. For example, when the course information Pc10 and the course information Pc11 in the course information Pc1 to Pc11 are about positions corresponding to the dangerous location Pd3, the information processing unit 24 adds the dangerous location information to the course information Pc10 and the course information Pc11. For example, when the course information Pc7 and the course information Pc8 in the course information Pc1 to Pc11 are about positions corresponding to the dangerous location Pd2, the information processing unit 24 may add the dangerous location information to the course information Pc7 and the course information Pc8.

Figures 4, 5:
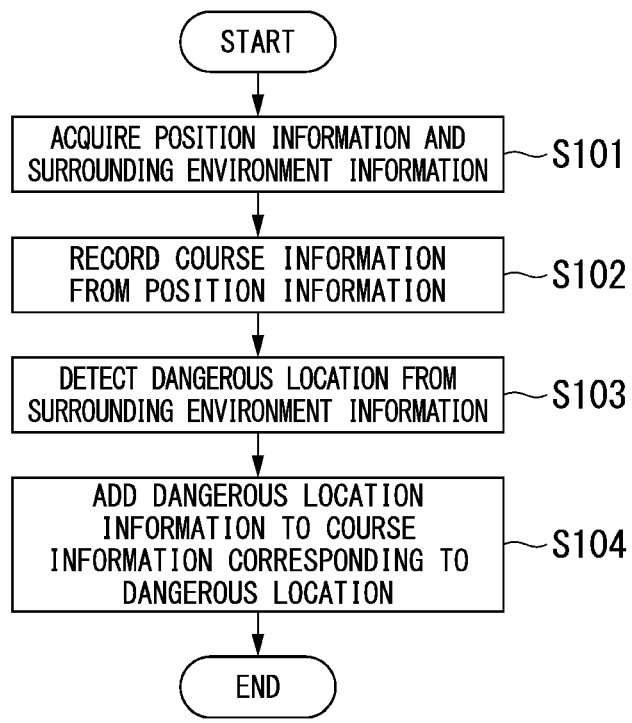
FIG. 4 is a diagram showing an example of course information stored in a storage unit according to the present embodiment in a table format.
FIG. 5 is a diagram for describing an operation flow of a course information generation process according to the present embodiment.

The course information Pc is stored in the storage unit 25. FIG. 4 is a diagram showing an example of the course information Pc stored in the storage unit 25 in a table format. A course information table is provided in the storage unit 25. For example, the storage unit 25 is a non-volatile memory.

In the course information table, the course information Pc and dangerous location information indicating whether or not the course information Pc is about a dangerous location Pd are associated and stored. The course information Pc indicates each of a plurality of pieces of course information Pc1, Pc2, and the like acquired in time series. In other words, in the course information table, the position information Pin on the travel route H and the dangerous location information indicating whether or not the position information Pm is about a dangerous location Pd are associated and stored (when the course information Pc is acquired from the position information Pm). The position information Pm indicates each of a plurality of pieces of position information acquired in time series. Also, in the present embodiment, the course information Pc with which the dangerous location information is not associated indicates that the course information Pc is not about the dangerous location Pd.

The travel control device 5 causes the vehicle M to perform autonomous travel or remotely controlled travel on the basis of the course information Pc stored in the storage unit 25. In the present embodiment, the travel control device 5 causes the vehicle M to perform autonomous travel on the basis of the course information Pc stored in the storage unit 25 in the autonomous travel mode.

Specifically, the travel control device 5 controls an accelerator AC, a brake BR, and a steering ST of the vehicle M so that the vehicle M travels according to the course information Pc stored in the storage unit 25 in the autonomous travel mode. When the vehicle M travels at the position of the course information Pc to which the dangerous location information is added, the travel control device 5 reduces a travel speed of the vehicle M to a prescribed speed or less. The position of the course information Pc to which the dangerous location information is added is a specific position on the travel route H indicated by the specific course information Pc to which the dangerous location information is added in the course information Pc1, Pc2, and the like acquired in time series.

Also, when the vehicle M is traveling at the position of the course information Pc to which the dangerous location information is added, the travel control device 5 may wirelessly transmit a notification indicating that the vehicle M is traveling at the dangerous location Pd to a terminal of a remote observer. The terminal of the remote observer is a terminal for the observer who remotely monitors the vehicle M to monitor the vehicle M.

Also, when the vehicle M is traveling at the position of the course information Pc to which the dangerous location information is added, the travel control device 5 may output a warning to a nearby area by an alarm sound, an announcement, or the like. A flow of an operation of the travel route generation device 4 according to the present embodiment will be described below with reference to FIG. 5. FIG. 5 is a diagram for describing an operation flow of a process of generating the course information Pc according to the present embodiment.

For example, the driver operates an operation unit (not shown) provided in the travel route generation device 4. Thereby, the travel route generation device 4 is shifted to the route acquisition mode. The driver drives the vehicle M and travels along the travel route H where autonomous travel of the vehicle M is desired to be performed. Thereby, the travel route generation device 4 is allowed to learn the travel route H.

Specifically, when the mode is shifted to the route acquisition mode, the travel route acquisition unit 21 acquires the position information Pm from the position information acquisition unit 20 in time series (step 101) and records the course information Pc of the travel route H (step S102). In other words, the travel route acquisition unit 21 records the position information Pm of the vehicle M acquired from the position information acquisition unit 20 in time series as the course information Pc of the travel route H. Further, in step S101, the surrounding environment information acquisition unit 22 acquires the captured image from the camera 10 and the measurement data from the distance sensor 11 as the surrounding environment information in accordance with the acquisition of the course information Pc. Also, the course information Pc acquired in the route acquisition mode is associated with the surrounding environment information.

When the traveling along the travel route H is completed, the driver operates the above-described operation unit (not shown) to end the route acquisition mode.

Next, the dangerous location detection unit 23 detects the dangerous location Pd where there is a risk of an accident on the basis of the surrounding environment information (step S103). Also, the dangerous location detection unit 23 may perform a process of detecting the dangerous location Pd in real time in the route acquisition mode or may perform a process of detecting the dangerous location Pd after the route acquisition mode is completed. In other words, the dangerous location Pd may be detected while the surrounding environment information is acquired from the surrounding environment information acquisition unit in the route acquisition mode or the dangerous location Pd may be detected from the surrounding environment information acquired in time series after the route acquisition mode ends.

When a process of detecting the dangerous location Pd in the dangerous location detection unit 23 is completed, the information processing unit 24 adds the dangerous location information including the first information indicating the dangerous location Pd to the course information Pc corresponding to the dangerous location Pd and stores the course information Pc to which the dangerous location information is added in the storage unit 25. For example, the information processing unit 24 stores the course information Pc corresponding to the dangerous location Pd detected by the dangerous location detection unit 23 and the dangerous location information in association in the storage unit 25 (step S104).

Thereby, a process of generating the course information Pc according to the present embodiment is completed.

Although the embodiment of the present disclosure has been described above in detail with reference to the drawings, the specific configuration is not limited to the embodiment and other designs and the like can be made without departing from the scope and spirit of the present disclosure.

Modified Example 1

Although the surrounding environment information acquisition unit 22 acquires the captured image and the measurement data as the surrounding environment information in accordance with the acquisition of the course information Pc in the above-described embodiment, the present disclosure is not limited thereto. The surrounding environment information acquisition unit 22 may acquire either the captured image or the measurement data as the surrounding environment information in accordance with the acquisition of the course information Pc.

Modified Example 2

In the above-described embodiment, the first information may be information indicating a type of dangerous location. For example, when the dangerous location Pd1 detected by the dangerous location detection unit 23 is a road marking of a pedestrian crossing, the information processing unit 24 may add information indicating the pedestrian crossing (information indicating that the dangerous location Pd1 is associated with the road marking of the pedestrian crossing) as the first information to the course information Pc corresponding to the road marking of the pedestrian crossing as shown in FIG. 6A. Also, when the dangerous location Pd2 detected by the dangerous location detection unit 23 is unevenness of the road surface, the information processing unit 24 may add information indicating the unevenness of the road surface (information indicating that the dangerous location Pd2 is associated with the unevenness of the road surface) as the first information to the course information Pc corresponding to the unevenness of the road surface as shown in FIG. 6A. Further, in the case of the dangerous location Pd3 detected by the dangerous location detection unit 23, the information processing unit 24 may add information indicating the dangerous location Pd3 (where the vehicle M and an obstacle are in proximity to each other) (information indicating that the dangerous location Pd3 is associated with proximity between the vehicle M and the obstacle) as the first information to the course information Pc corresponding to the dangerous location Pd3 as shown in FIG. 6A.

Modified Example 3

The above-described information processing unit 24 may add dangerous location information further including second information indicating an operation of the vehicle M for reducing the risk at the dangerous location Pd to the course information Pc corresponding to the dangerous location Pd detected by the dangerous location detection unit 23. For example, the information processing unit 24 may add information indicating a temporary stop operation or a deceleration operation as the second information indicating the operation of the vehicle M for reducing the risk at the dangerous location Pd1 to the course information Pc corresponding to the dangerous location Pd1 detected by the dangerous location detection unit 23 as shown in FIG. 6B. Also, the information processing unit 24 may add information indicating an avoidance operation as the second information indicating the operation of the vehicle M for reducing the risk at the dangerous location Pd2 to the course information Pc corresponding to the dangerous location Pd2 (the unevenness of the road surface) detected by the dangerous location detection unit 23 as shown in FIG. 6B. The above avoidance operation is a travel operation for avoiding the dangerous location Pd2. Also, the information processing unit 24 may add information indicating a deceleration operation as the second information indicating the operation of the vehicle M for reducing the risk at the dangerous location Pd3 to the course information Pc corresponding to the dangerous location Pd3 detected by the dangerous location detection unit 23 as shown in FIG. 6B.

Thereby, in the autonomous travel mode, the travel control device 5 reads the second information and performs an operation according to each dangerous location Pd when the vehicle M is allowed to perform autonomous travel on the basis of the course information Pc stored in the storage unit 25. Thereby, it is possible to reduce the risk of accidents.

Modified Example 4

When the above-described control device 3 causes the vehicle M to perform remotely controlled travel, the travel control device 5 may forcibly restrict a travel speed of the vehicle M to a prescribed speed or less when the vehicle M travels at the dangerous location Pd. Further, the travel control device 5 may notify a remote controller when the vehicle M travels at the dangerous location Pd or may output a warning to a near area by an alarm sound, an announcement, or the like.

Modified Example 5

Although three types of dangerous locations (the dangerous location Pd1, the dangerous location Pd2, and the dangerous location Pd3) as the dangerous location Pd have been described as an example in the above-described embodiment, the present disclosure is not limited thereto. In the present disclosure, a location where there is a risk of an accident may be detected as a dangerous location Pd, and the types of dangerous locations and the number of dangerous locations are not particularly limited.

Modified Example 6

The dangerous location Pd1 may be a location with a road marking, a location with a runway sign, or both.

As described above, the travel route generation device 4 according to the present embodiment adds the dangerous location information including the first information indicating the dangerous location Pd to the course information Pc corresponding to the dangerous location Pd detected by the dangerous location detection unit 23.

According to the above configuration, when the vehicle M is allowed to perform autonomous travel on the basis of the course information Pc, the dangerous location Pd can be ascertained from the dangerous location information added to the course information Pc and the vehicle M can be allowed to perform autonomous travel safely.

Also, all or part of the above-described travel route generation device 4 may be implemented by a computer. In this case, the computer may include a processor such as a CPU or a graphics processing unit (GPU) and a computer-readable recording medium. Also, all or some functions of the above-described travel route generation device 4 may be implemented by recording a program for implementing the functions in the computer on a computer-readable recording medium and causing the processor to read and execute the program recorded on the recording medium. Here, the "computer-readable recording medium" refers to a flexible disk, a magneto-optical disc, a ROM, a portable medium such as a CD-ROM, or a storage unit such as a hard disk embedded in a computer system. Further, the "computer-readable recording medium" may include a computer-readable recording medium for dynamically retaining the program for a short time period as in a communication line when the program is transmitted via a network such as the Internet or a communication circuit such as a telephone circuit and a computer-readable recording medium for retaining the program for a given time period as in a volatile memory inside the computer system including a server and a client when the program is transmitted. Also, the above-described program may be a program for implementing some of the above-described functions. Further, the above-described program may be a program capable of implementing the above-described function in combination with a program already recorded on the computer system or may be a program capable of implementing the above-described function using a programmable logic device such as a field programmable gate array (FPGA).

INDUSTRIAL APPLICABILITY

According to the present disclosure, it is possible to allow a vehicle to travel safely.

REFERENCE SIGNS LIST

1 Travel control system
2 Surrounding environment measurement device
3 Control device
4 Travel route generation device
5 Travel control device
20 Position information acquisition unit
21 Travel route acquisition unit
22 Surrounding environment information acquisition unit
23 Dangerous location detection unit
24 Information processing unit
25 Storage unit

The invention claimed is:

1. A control device comprising:
a travel route generation device,
   the travel route generation device including:
     at least one memory storing instructions; and
     at least one processor configured to execute the instructions;
   wherein the at least one processor is configured to:
     acquire position information about a moving object and acquire surrounding environment information which is information about a surrounding environment of the moving object, when the moving object does not perform autonomous travel or remotely controlled travel;
     record the position information acquired as course information of a travel route along which the moving object is to perform autonomous travel or remotely controlled travel;
     detect dangerous locations where there is a risk of an accident when the moving object travels along the travel route, from the surrounding environment information acquired;
     add dangerous location information including first information indicating the dangerous locations, to course information corresponding to the dangerous locations detected of the course information recorded; and
     store a course information table including the course information corresponding to the dangerous locations detected and the dangerous location information added to the course information corresponding to the dangerous locations detected, in a storage unit; and
   wherein the at least one processor is further configured to:
     add the dangerous location information further including second information indicating an operation of the moving object for reducing a risk at the dangerous location, to the course information corresponding to the dangerous location detected of the course information recorded; and
a travel control device,
   the travel control device configured to cause the moving object to perform the autonomous travel or the remotely controlled travel on the basis of the course information table stored in the storage unit,
   wherein the travel control device is further configured to control the travel of the moving object such that operation of the moving object indicated by the second information is performed when the moving object travels at a position of the course information to which the dangerous location information is added.

2. The control device according to claim 1, wherein the dangerous locations include at least one of a first dangerous location having a road marking and a second dangerous location where the moving object and an obstacle are in proximity to each other.

3. The control device according to claim 1,
wherein the second information includes information indicating that a travel speed of the moving object is decelerated to a prescribed speed or less.

* * * * *